Oct. 25, 1949.          C. R. STEVENS          2,485,851
                    ELECTRIC MELTING FURNACE
Filed Feb. 27, 1947                       3 Sheets-Sheet 1

INVENTOR
CHARLES R. STEVENS
BY
Toulmin & Toulmin
ATTORNEYS

Oct. 25, 1949.  C. R. STEVENS  2,485,851
ELECTRIC MELTING FURNACE
Filed Feb. 27, 1947  3 Sheets-Sheet 3

INVENTOR
CHARLES R. STEVENS
BY
Toulmin & Toulmin
ATTORNEY

Patented Oct. 25, 1949

2,485,851

UNITED STATES PATENT OFFICE 2,485,851

ELECTRIC MELTING FURNACE

Charles R. Stevens, Toledo, Ohio, assignor, by mesne assignments, to Glass Fibers, Inc., Waterville, Ohio Application February 27, 1947, Serial No. 731,236

7 Claims. (Cl. 13—6)

This invention relates to a heating crucible for melting raw materials that are to be drawn into fine fibers or filaments and from which the fine fibers or filaments will be drawn from the molten mass of the material obtained within the heating crucible. More particularly, the invention relates to a heating crucible for melting glass materials and for refining the molten material in its passage to a reservoir of molten material from which fine fibers or filaments are drawn. The subject matter of the present application is similar to that of applicant's copending application 666,254 filed on May 1, 1946.

An object of the invention is to provide a heating and melting crucible wherein the raw materials are introduced into a heating chamber to render them molten and are allowed to flow by gravity over a highly heated surface to refine the molten material which is subsequently collected in a reservoir beneath the heating chamber from which the molten material will be drawn into fine fibers or filaments.

Still another object of the invention is to provide a heating and melting crucible in accordance with the foregoing object wherein the planing surface is maintained at a high temperature to cause entrained gas to be separated from the molten material as it passes over the planing surface, and wherein the refined material is held at a somewhat lower temperature in a reservoir from which fine fibers or filaments of the material are drawn.

Still another object of the invention is to provide a heating and melting crucible in accordance with the foregoing objects wherein gases separated from the molten material while it is being refined can be exhausted periodically or automatically from within the heating crucible.

Still another object of the invention is to provide a heating and melting crucible for melting glass materials that will provide for more complete elimination of gases from the melted material for obtaining a substantially seed-free glass from which fine fibers or filaments can be drawn mechanically.

Further objects and advantages will become apparent from the drawings and the following description.

Figure 1:
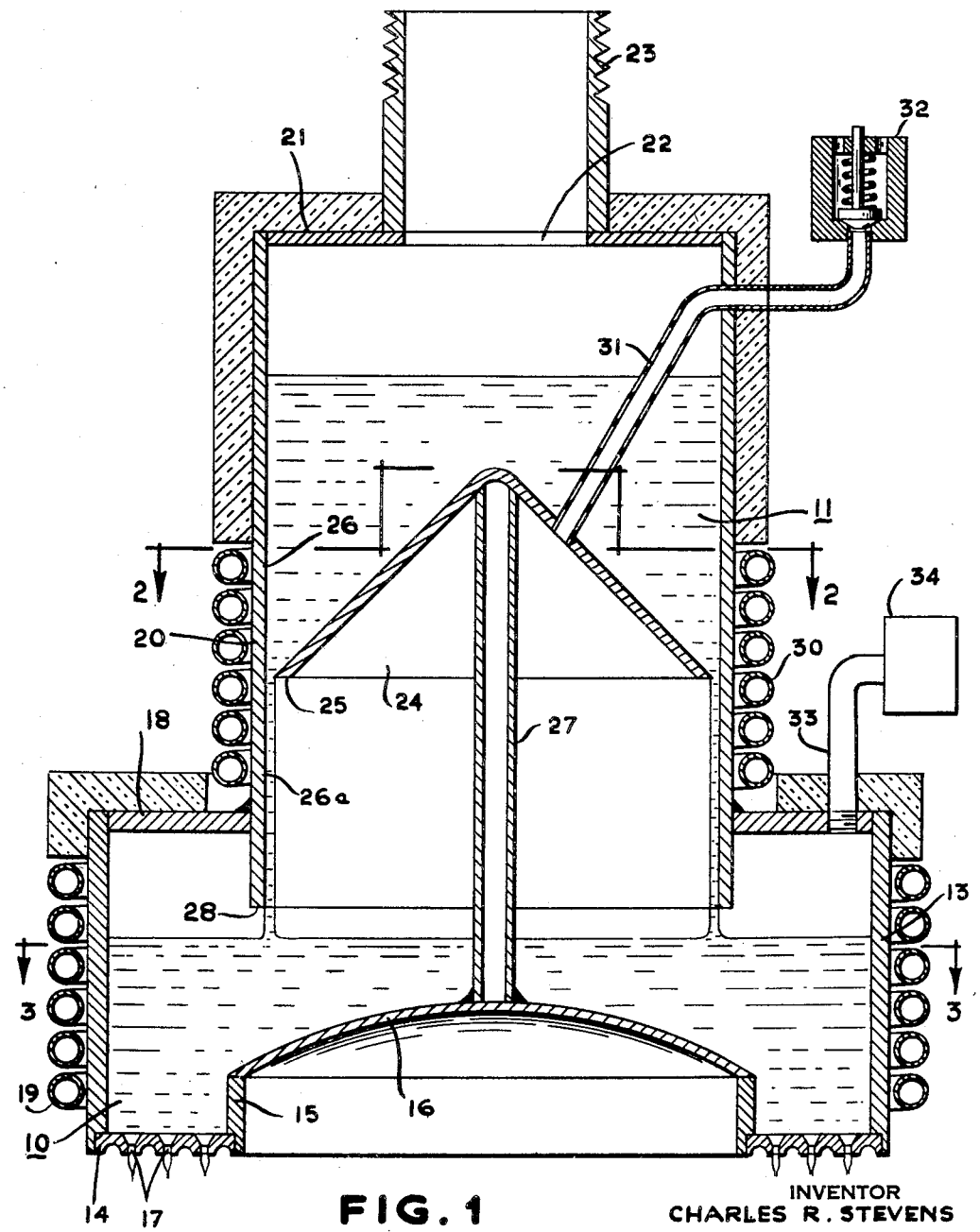
Figure 1 is a vertical cross-sectional view of an apparatus constructed in accordance with this invention.

The melting and drawing crucible of this invention is particularly adapted for the mechanical drawing of fine fibers or filaments from a body of molten material, which filaments have a diameter on the order of .00025 to .0004". The conditions under which such fine filaments are drawn from molten materials must be controlled precisely to avoid any variation in the diameter of the drawn filament. Also, when drawing such filaments from molten glass, it is essential that the glass shall be substantially seed-free to avoid breakage of the fibers or filaments as they are being drawn.

It has been determined that glass fibers or filaments can be drawn to the small diameters referred to above by drawing the glass at temperatures substantially below that at which the glass normally melts, but at which temperatures the glass is still highly viscous. To draw the glass fibers or filaments at temperatures below what may be termed melting temperatures, it has been found entirely satisfactory to cause the molten material to be exuded through fine orifices in the nature of .004" in diameter while the glass or molten material is at a temperature in the neighborhood of 2250° F. Under these circumstances, the body of the molten material is retained under a constant pressure so as to exude the molten material through the small orifices at a constant rate. The filaments will be drawn from the material as it is exuded through the orifices at a constant rate and thereby obtain constant diameter filaments.

However, in melting materials and preparing them for use in the drawing of filaments, and particularly when melting glass materials, substantial amounts of gas are held in the body of molten material. These small gas bubbles in the molten material cause a break in the continuity of the drawing of the filaments when they pass through the small orifices, and if the filament retains its continuous length and the gas bubble passes through the orifice and is confined in the filament, a weak point in the filament is developed and renders it highly susceptible to breakage. Therefore, to draw successfully fine diameter filaments, it is preferable, if not necessary, to have a substantially seed-free material, and this is particularly true when drawing glass fibers or filaments.

The heating and melting crucible of this invention is therefore directed to the purpose of obtaining a molten material, particularly glass, from which fine fibers or filaments can be drawn that is substantially seed-free.

In this invention the heating or melting crucible and/or drawing crucible consists primarily of two parts which can be termed a drawing chamber 10 and a melting chamber 11.

The drawing chamber 10 consists of a cylindrical side wall 13 that has an annular orifice plate 14 secured to one edge thereof. The annular orifice plate 14 is also secured to a cylindrical inner wall 15 of the drawing chamber 10. This inner wall 15 supports a spherical wall 16 forming the bottom wall of the drawing chamber 10, the orifice plate 14 also forming a part of the bottom wall of the chamber 10 and being positioned at the lowest point thereof.

The orifice plate 14 is provided with a plurality of openings or orifices 17 therein through which the molten material above the plate 14 is forced to pass. These orifices may have a diameter in the nature of .004".

The drawing chamber 10 is provided with a top wall 18 secured to the upper edge of the cylindrical side wall 13.

To heat the drawing chamber 10 and maintain the molten material in the drawing chamber at the desired temperature of approximately 2250°, there is provided a high frequency heating coil 19 positioned around the side wall 13 of the drawing chamber 10. This coil 19 is connected to a suitable source of high frequency energy for the purpose of heating the walls of the chamber 10 that are preferably constructed of a platinum rhodium alloy or other high-temperature material that is not substantially affected by contact with molten glass.

The temperature of the body of molten material in the drawing chamber 10 may be controlled by regulating the amount of energy dissipated by the high frequency coil 19.

The top wall 18 of the drawing chamber 10 supports the melting chamber 11, the melting chamber 11 consisting of a cylindrical side wall 20 and a top wall 21, the cylindrical side wall 20 being secured to the top wall 18 of the chamber 10. A filling opening 22 through which raw material is introduced into the melting chamber 11 is provided in the top wall 21 of the chamber since the interiors of the melting chamber 11 and drawing chamber 10 are to be placed under pressure to cause the molten material to exude through the orifices 17. A suitable air-lock apparatus may be connected to the member 23 to prevent escape of pressure from within the heating and melting crucible when raw material is introduced through the opening 22. This air-lock device does not form any part of this invention, hence it is not described or illustrated.

A conical deflector plate 24 has the base edge 25 thereof disposed in close proximity to the inner surface 26 of the wall 20. This deflector plate is supported from the bottom wall 16 of the drawing chamber 10 by means of a tubular support member 27 and divides the crucible into the melting chamber 11 and drawing chamber 10 previously referred to. The distance between the base edge 25 of the deflector plate 24 and the lower edge 28 of the wall 20, which is a continuation of the melting chamber 11, determines the area of the planing surface over which the molten material melted in the chamber 11 will be caused to flow for the purpose of eliminating from the molten material in its passage along this surface gases that are entrained in the molten material. The planing surface 26a may therefore be varied by changing the vertical position of the deflector plate 24 relative to the bottom edge 28 of the wall 20.

To provide for satisfactory refining of the molten material in its passage over the planing surface 26a, high frequency heating coils 30 are provided to encircle the wall 20 of the melting chamber 11 and extend below the deflector plate 24 that forms the bottom wall of the melting chamber for heating the planing surface 26a forming the upper portion of the drawing chamber 10 to maintain this surface at any desired temperature, preferably substantially above the temperature at which the molten material is maintained in the lower portion of the drawing chamber 10. Under normal circumstances, when heating and melting glass materials, the temperature of the melting chamber will be maintained in the neighborhood of 2800 to 3000° F. to satisfactorily melt the glass material and to render it into a condition of high fluidity to allow gas to escape from the thin film of molten material as it passes along the heated planing surface 26a. The heating coils 30 will therefore maintain the temperature of the melting chamber 11 in a range of approximately 2800 to 3000° F. as controlled by suitable means which regulates the source of the high frequency energy.

As the molten material is refined in its travel downwardly over the planing surface 26a, gases will be expelled from the material which will collect in the upper portion of the conical-shaped deflector plate 24. Thus, an exhaust pipe 31 connects the interior of the deflector plate 24 with the exterior of the chamber 11 and has a suitable valve 32 thereon which controls the opening and closing of the pipe 31. As shown on the drawing, the valve 32 is a spring-actuated relief valve which may be adjustably set to relieve pressure at a predetermined value. However, the valve 32 may be replaced with a hand-operated valve which can be used to periodically bleed the gases from beneath the deflector plate 24 by periodic opening of the hand-controlled valve.

To provide for pressure in the drawing chamber 10 to exude the molten material through the orifices 17, a pipe 33 connects the interior of the chamber 10 with a suitable source of pressure 34. The source of pressure is provided with suitable regulation to maintain the pressure within the drawing chamber 10 at a constant value.

From the foregoing description of the heating and melting crucible, it will be seen that the melting of the batch of material is kept entirely separate from the body of molten refined material and that an extended and large-area planing surface is provided between the unrefined melted material and the refined molten material and that independent temperature control may be had over the temperature of the material while being melted and after it is refined and ready for drawing of fine fibers or filaments therefrom.

Figure 2:
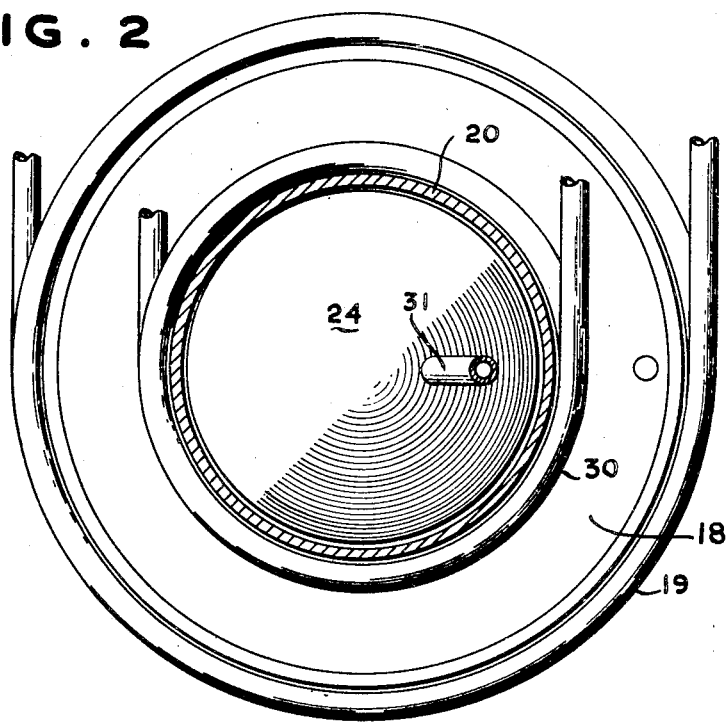
Figure 2 is a horizontal cross-sectional view taken along line 2—2 of Figure 1.
Figure 3:
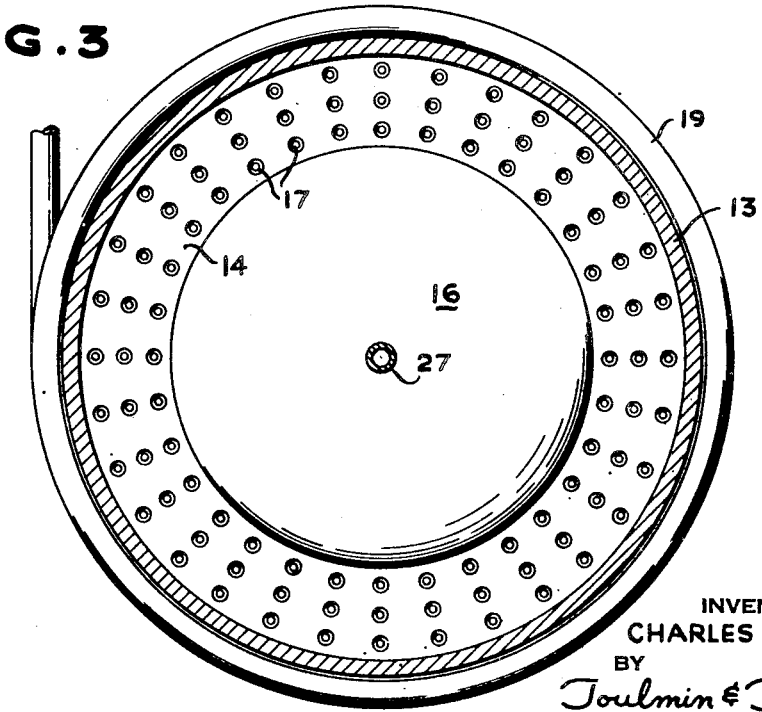
Figure 3 is a horizontal cross-sectional view taken along line 3—3 of Figure 1.
Figure 4:
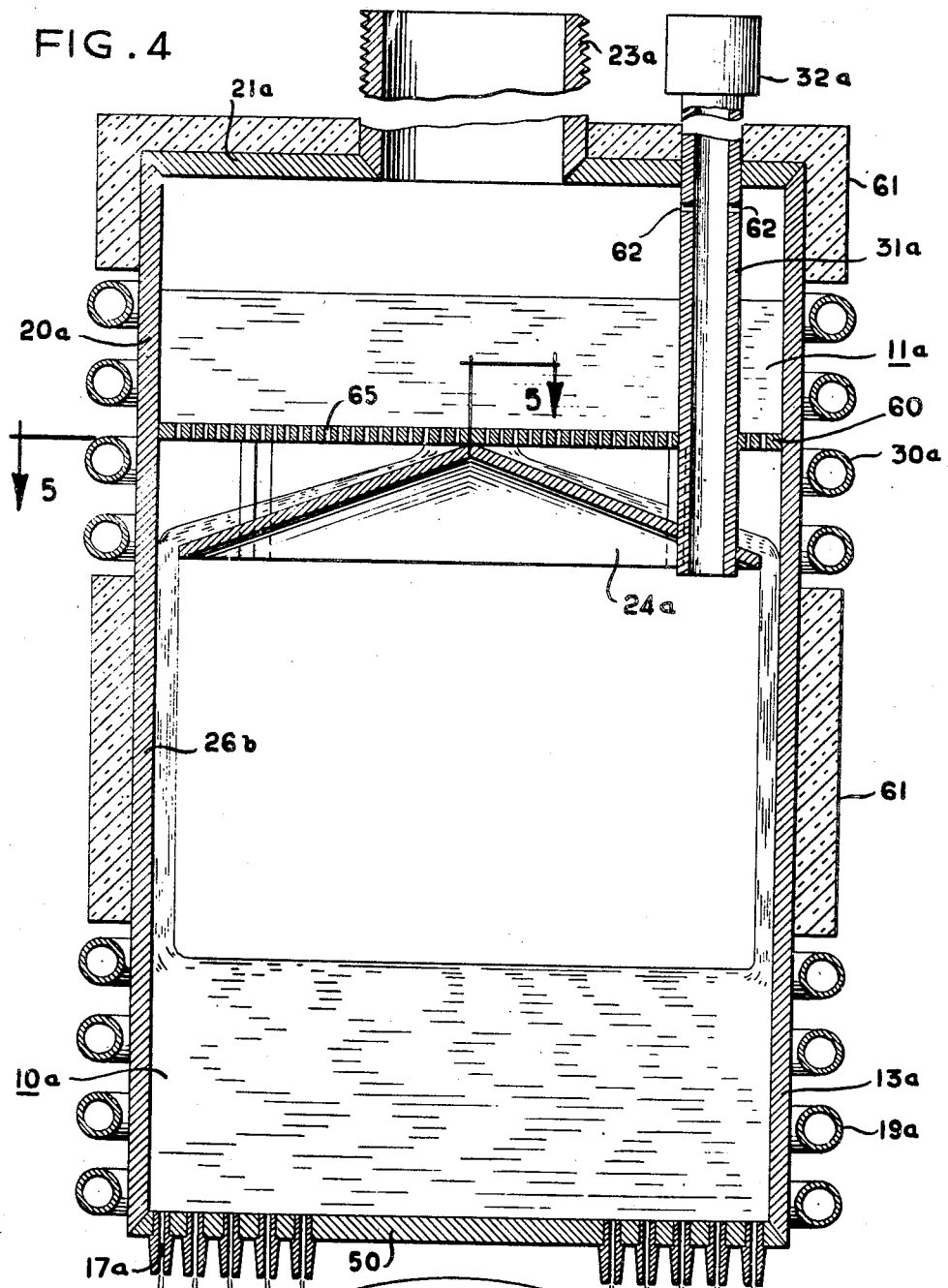
Figure 4 is a vertical cross-sectional view of a modified arrangement of the apparatus.
Figure 5:
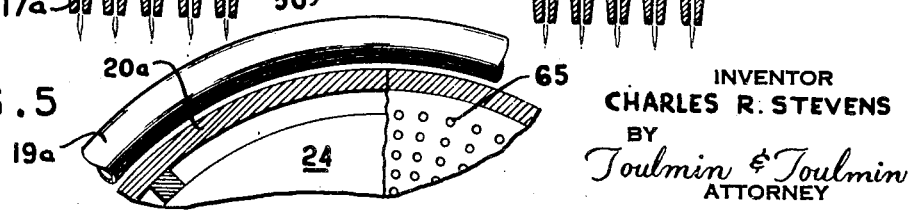
Figure 5 is a horizontal cross-sectional view of a portion of the apparatus illustrated in Figure 4 taken along line 5—5 of Figure 4.

The apparatus described in Figures 4 and 5 is a modified arrangement of the apparatus heretofore disclosed and described with reference to Figures 1 to 3. Therefore, like parts of the modified arrangement of the device will be identified with the same numerals except that the suffix "A" will be added to the numerals.

In Figure 4 the apparatus consists of a cylindrical wall 13A that is closed with a top wall 21A and a bottom wall 50. Orifices 17A are provided in the bottom wall 50 and function in the same manner as orifices 17 in Figure 1. The cylindrical heating crucible is divided into a melting chamber 11A and a drawing chamber 10A by the baffle 24A in substantially the same manner as baffle 24 divides the heating crucible into the melting chamber 11 and the drawing chamber 10. The heating coil 30A is provided around the melting chamber 11A and the heating coil 19A is placed around the drawing chamber 10A. An inlet opening 23A is provided for admitting raw glass materials into the melting chamber 11A, and is connected to an air lock in the same manner as previously described with reference to the ceiling opening 23 of the device illustrated in Figure 1.

A conduit 31A, similar to the conduit 31 of Figure 1, is provided for conducting gases from within the drawing chamber 10A to a point exterior of the melting crucible under control of a valve 32A in a manner heretofore described and disclosed.

A baffle plate 60 is positioned above the cone-shaped baffle 24A and has a plurality of orifices 65 disposed over the surface of the plate 60. These orifices 65 are of a diameter smaller than the diameter of the orifices 17A to prevent particles of unmelted materials from passing through the plate 60 that would tend to clog the orifices 17A. Since the orifices are smaller than orifices 17A any particles that pass through plate 60 will also pass through the orifices 17A without difficulty, if they have not been melted by the time they reach the orifices 17A.

The cone shaped baffle 24A causes the melted glass from the melting chamber 11A to flow over the planing surface 26b to fine the glass in the same manner as heretofore described with reference to Figure 1.

Insulating material 61 is provided around the crucible to conserve heat within the crucible. The heating coils 19A and 30A are connected to a source of high frequency current in the same manner as the heating coils 18 and 30, illustrated in Figure 1.

The conduit 31A is provided with ports 62 which collect gas from the melting chamber 11 to allow the gas to exhaust from the melting chamber along with the gas that is exhausted from the drawing chamber 10A.

The melting crucible is divided with a cone-shaped partition wall into a melting chamber 11 and a drawing chamber 10, of Figure 1, and a melting chamber 11A and a drawing chamber 10A, of Figure 4. In both instances the melting chamber ends at the near juncture between the cone-shaped partition wall or baffle 24, Figure 1, or 24A, Figure 4 and the side wall of the crucible. In these respects, the melting chamber ends and the drawing chamber begins at the same place in both forms of the construction of the device.

Also, in both forms of the device there is a wall portion that forms the planing surface. In both instances this is provided by a wall portion of the crucible between the near juncture of the baffle 24, 24A and the wall of the crucible that extends below this near juncture and the surface of the glass in the drawing chamber 10, 10A.

Also, there is the common feature that the conduit for providing for escape of gas from the drawing chamber connects with the cone-shaped baffle to allow escape of the gas from beneath the baffle, in both of the modifications of the device.

The apparatus disclosed herein constitutes a preferred form of the invention, but it is understood that it is capable of modification without departing from the spirit of the invention, and that all modifications that fall within the scope of the appended claims are intended to be included herein.

Having thus fully described my invention, what I claim as new and desire to secure by Letters Patent is:

1. A heating and melting crucible comprising, a melting chamber having an open bottom, a partition wall transversely of said chamber forming the bottom wall thereof and dividing the same from a lower drawing chamber, the periphery of said partition wall being positioned in close proximity to the inner periphery of said chamber to provide a passage therebetween through which molten material flows in a sheet-like flow, a planing surface formed by the upper portion of said lower chamber providing for planing of material flowing through said passage, a feed opening in said melting chamber, heating means disposed around said melting chamber and around said passage, said drawing chamber extending beneath said planing surface to receive molten material therefrom into the lower portion of the said drawing chamber, a wall of said drawing chamber having a plurality of orifices therein through which material therein may be discharged, and heating means around said drawing chamber.

2. A heating and melting crucible comprising, a melting chamber having an open bottom, a partition wall transversely of said chamber forming the bottom wall thereof and dividing the same from a lower drawing chamber and having the peripheral edge thereof in close proximity to the inner periphery of said chamber to provide an opening therebetween around the entire periphery of said partition wall through which molten material flows in a sheet-like flow, said partition wall having the upper surface thereof sloping upwardly toward the center of the partition wall to provide for uniform movement of molten material in the melting chamber outwardly toward said opening, a planing surface formed by the upper portion of said lower chamber providing for planing of molten material flowing through said opening, heating means around said melting chamber and extending below said opening to melt material in the melting chamber and heat said planing surface, said drawing chamber extending beneath said planing surface to receive molten material therefrom into the lower portion of the said drawing chamber and having a wall provided with a plurality of orifices through which molten material in the lower part of said drawing chamber is discharged, and heating means around the lower portion of said drawing chamber.

3. A heating and melting crucible comprising, a cylindrical melting chamber having an open bottom, a circular partition wall transversely of said chamber forming the bottom wall thereof and dividing the same from a lower cylindrical drawing chamber and having the peripheral edge thereof in close proximity to the inner periphery of said chamber to provide an opening therebetween around the entire periphery of said partition wall through which molten material flows in a sheet-like flow, said partition wall having the upper surface thereof sloping upwardly toward the center of the partition wall to provide for uniform movement of molten material in the melting chamber outwardly toward said opening, a planing surface formed by the upper portion of said lower chamber providing for planing of molten material flowing through said opening, heating means around said melting chamber and extending below said opening to melt material in the melting chamber and heat said planing surface, said drawing chamber extending beneath said planing surface to receive molten material therefrom into the lower portion of the said drawing chamber and having a wall provided with a plurality of orifices through which molten material in the lower part of said drawing chamber is discharged, heating means arranged circularly around the lower portion of said drawing chamber.

4. A heating and melting crucible comprising, a cylindrical melting chamber having an open bottom, a cone-shaped partition wall transversely of said melting chamber forming the bottom wall thereof and dividing the same from a lower drawing chamber, said partition wall forming a cone-shaped bottom wall surface for said melting chamber and a cone-shaped upper portion of the lower drawing chamber, the periphery of said partition wall being positioned in close proximity to the inner periphery of said melting chamber to provide a passage of uniform width therebetween through which molten material flows from the melting chamber to the drawing chamber in a sheet-like flow, a planing surface formed by the upper portion of said lower chamber receiving said sheet-like flow of molten material and providing for planing of material flowing thereover, a feed opening in said melting chamber, heating means disposed around said melting chamber and around said passage, said drawing chamber extending beneath said planing surface to receive molten material therefrom into the lower portion of the said drawing chamber, said drawing chamber having the bottom wall thereof provided with a plurality of orifices therein through which molten material in the drawing chamber is discharged, and heating means around said drawing chamber.

5. A heating and melting crucible comprising, a cylindrical melting chamber having an open bottom, a cone-shaped partition wall transversely of said melting chamber forming the bottom wall thereof and dividing the same from a lower drawing chamber, said partition wall forming a cone-shaped bottom wall surface for said melting chamber and a cone-shaped upper portion of the lower drawing chamber, the periphery of said partition wall being positioned in close proximity to the inner periphery of said melting chamber to provide a passage of uniform width therebetween through which molten material flows from the melting chamber to the drawing chamber in a sheet-like flow, a planing surface formed by the upper portion of said lower chamber receiving said sheet-like flow of molten material and providing for planing of material flowing thereover, a feed opening in said melting chamber, heating means disposed around said chambers and around said passage, said drawing chamber extending beneath said planing surface to receive molten material therefrom into the lower portion of the said drawing chamber, said drawing chamber having the bottom wall thereof provided with a plurality of orifices therein through which molten material in the drawing chamber is discharged, heating means around said drawing chamber, and conduit means connected at substantially the apex of said cone-shaped partition wall for escape of gas from said drawing chamber beneath said partition wall and including means for regulating the escape of gas through said conduit means.

6. A heating and melting crucible comprising, a melting chamber having an open bottom, a partition wall transversely of said chamber forming the bottom wall thereof and dividing the same from a lower drawing chamber and having the periphery thereof in close proximity to the inner periphery of said chamber to provide a passage of uniform width therebetween through which molten material flows in a sheet-like flow, a planing surface formed by the upper portion of said lower chamber receiving the said sheet-like flow of molten material and providing for planing of material flowing through said passage, a feed opening in said melting chamber, heating means positioned around said melting chamber and extending below said passage to melt material in the melting chamber and maintain the sheet-like flow of molten material at a high temperature when passing through said passage, said planing surface extending below said heating means to provide for cooling down of the molten material flowing thereover before delivery into the lower portion of said drawing chamber, heating means around the lower portion of said drawing chamber to maintain molten material therein at a controlled temperature, said drawing chamber having a plurality of orifices in the bottom wall thereof through which molten material in the drawing chamber is discharged, and a perforate partition wall transversely of said melting chamber above said first-mentioned partition wall and through which molten material flows before engaging said first-mentioned partition wall, said perforate partition wall having openings therein of smaller diameter than said orifices to prevent passage of unmelted material through said perforate partition wall of sufficient size to clog said orifices.

7. A melting chamber having an open bottom, a partition wall transversely of said chamber forming the bottom wall thereof and dividing the same from a lower drawing chamber and having the peripheral edge thereof in close proximity to the inner periphery of said chamber to provide an opening therebetween through which molten material flows in a sheet-like flow, a planing surface formed by the upper portion of said lower chamber providing for planing of molten material flowing through said opening, heating means around said melting chamber and extending below said opening to melt material in the heating chamber and heat said planing surface, said drawing chamber extending below said planing surface to receive molten material therefrom and having a wall provided with a central solid unperforated portion and a series of orifices arranged circularly around said central portion and between the said central portion and the outer wall of said drawing chamber, and heating means around the lower portion of said drawing chamber.

CHARLES R. STEVENS.

REFERENCES CITED

The following references are of record in the file of this patent:

UNITED STATES PATENTS

| Number | Name | Date |
|---|---|---|
| 706,283 | Voelker | Aug. 5, 1902 |
| 1,427,014 | Von Pazsiczky | Aug. 22, 1922 |
| 1,601,523 | George | Sept. 28, 1926 |
| 1,611,328 | Arbogast | Dec. 21, 1926 |
| 2,008,495 | Ferguson | July 16, 1935 |
| 2,018,885 | Ferguson | Oct. 29, 1935 |
| 2,022,112 | Ferguson | Nov. 26, 1935 |
| 2,178,871 | Drill | Nov. 7, 1939 |
| 2,187,094 | Pink | Jan. 16, 1940 |
| 2,225,667 | Staelin | Dec. 24, 1940 |
| 2,227,357 | Martin | Dec. 31, 1940 |
| 2,244,267 | Slayter et al. | June 3, 1941 |
| 2,250,155 | Ferguson | July 22, 1941 |
| 2,335,135 | Staelin | Nov. 23, 1943 |
| 2,360,373 | Tiede | Oct. 17, 1944 |
| 2,398,952 | Nachod | Apr. 23, 1946 |

FOREIGN PATENTS

| Number | Country | Date |
|---|---|---|
| 354,763 | Great Britain | Aug. 10, 1931 |
| 478,334 | Great Britain | Apr. 8, 1936 |
| 498,707 | Great Britain | Jan. 12, 1939 |
| 104,379 | Sweden | Feb. 26, 1942 |